Patented Feb. 17, 1931

1,793,345

UNITED STATES PATENT OFFICE

EDWIN C. WALLACE, OF NEWTON, MASSACHUSETTS

BITUMINOUS PAVING COMPOSITION AND METHOD OF PREPARING THE SAME

No Drawing.    Application filed April 23, 1927.    Serial No. 186,171.

This invention relates to bituminous paving compositions and the method of preparing the same, and has for its object the production of a paving mixture prepared by the "hot mixed method" which may be laid immediately after mixing or kept for an indeterminate time and laid cold.

In the construction of bituminous pavements experience has shown that the best results can be assured only by the use of bituminous mixtures prepared by combining heated mineral aggregate with heated bituminous cement, then spreading and compacting in place before the mixture has become chilled. This method in chilly, wintry weather, necessitates quick action on the part of the street construction forces and often proves to be a source of annoyance and expense. Many attempts have been made to prepare mixtures workable at atmospheric temperature chiefly by means of "cut back" compositions of various types, in which a volatile solvent is used combined directly with the bitumen or applied to the stone before the addition of the bitumen, but thus far such practice has met only with indifferent success, even upon roads whereon the traffic is light. It is an object of this invention to prepare a paving mixture by the hot mixed method which may be laid either hot or cold with equally assured success. This is accomplished by thoroughly mixing heated mineral aggregate of any desired type (coarse or fine aggregate) with heated bituminous cement to form an agglutinated mass, then immediately converting it into a non-coherent granular and friable condition by adding thereto and commingling therewith a cold finely divided composition consisting of an intimate combination of mineral matter and bitumen which composition may be either natural or especially prepared. The cold composition is added in sufficient quantity to prevent agglomeration of the heated mass, if the latter is chilled without being compressed. This cold composition as added possesses certain qualities which particularly adapt it to the purpose. It is moisture free and is readily miscible in all proportions with oily or bituminous compositions of any nature. Although in a granular or pulverulent condition probably due to the quantity and quality of the bituminous content, it can be consolidated readily into a firm coherent body without other treatment than the application of pressure, and when added in proper proportion to a hot mixture of bitumen and mineral matter imparts the same properties the the entire mass. That is to say, the hot, gummy, unwieldly mass is converted into a granular, friable material easily workable at atmospheric temperature and compressible into a firmly coherent mass by any of the methods usually employed in compacting bituminous mixtures.

The method of preparing the improved paving composition in accordance with this invention is as follows:—

The mineral aggregate, which may be of any desired type either coarse or fine, is heated to a temperature ranging from 220° to 425° Fahrenheit, and a carefully weighed portion is combined in a suitable mixer with heated asphalt cement of the desired consistency, ranging according to conditions of use from 30° to 150° penetration on any of the standard penetration machines now in general use. Sufficient of the asphalt is used to thoroughly coat each of the particles of the aggregate, the amount usually required ranging from 4% to 15% of the weight of the mineral aggregate according to its character. After the heated mineral aggregate and the heated bituminous cement have been thoroughly mixed, the cold granular composition of mineral matter and bitumen is added, and the mixing continued until the cold composition is thoroughly distributed throughout the entire mass and between the coated particles of the aggregate. The mixture as a whole loses its gummy and sticky character and becomes more or less granular and substantially non-coherent until it is subjected to pressure or is compacted by any of the usual methods. The amount of the cold granular bituminous composition required naturally varies with the character of the mineral aggregate of the hot mixture, from 5% to 20% being generally sufficient for a coarse aggregate mixture, but in fine aggregate mixtures up to 40% or more may be used with advantage. The material which is referred to for use for this purpose may be an especially prepared mixture, but it is not intended to confine this invention to the use of any special materials, as it is found that equally the same or at least similar results will follow from the use of any mixture of mineral matter and bitumen which can be reduced to a granular or pulverulent condition. For example, there may be taken old asphalt mixtures cut from streets and reduced to powder more or less coarse, and if need be in some instances adding thereto more bitumen or more flux. It may then be used as the granulating medium to prevent balling or agglomeration of the heated mixture when it becomes chilled. Such material as here referred to may be embraced in the expression "cold, finely divided bitumen-containing composite material" as used in certain of the appended claims.

The term "bituminous" as used in the appended claims is intended to cover "asphaltic" as well, since asphalt is to be considered as a specific kind of bituminous material.

After the cold granular composition has been incorporated into it, the mixture may be hauled to the street and laid the same as any hot mixed paving mixture, as it will be found to be free working. Or, the mixture as a whole may be stored and used as required without the necessity for reheating it at any time. It is free working at all temperatures above 50° F. and can be handled in a temperature as low as 30° F.

What I claim is:—

1. The method of preparing bituminous paving compositions workable at atmospheric temperature which comprises the coating of heated particles of mineral matter with heated bituminous cement in sufficient quantity to cause agglomeration when the mass becomes chilled, but prior to chilling, adding to said mass a quantity of cold, non-coherent, non-hygroscopic composition comprising mineral particles coated with bituminous cement, the latter composition in quantity being sufficient to render the entire mass granular and friable but susceptible of consolidation into a firmly coherent mass by the application of pressure alone.

2. The method of preparing bituminous paving compositions workable at atmospheric temperature which comprises the mixing of heated mineral matter and heated bituminous cement in sufficient quantity to form an agglutinated mass, then adding thereto a previously prepared composition consisting of old paving mixtures reduced to a coarse powdery condition and containing bitumen and mineral matter, the quantity of the latter composition being sufficient to render the entire mass granular and friable but susceptible of consolidation into a firmly coherent mass by the application of pressure alone.

In testimony whereof I affix my signature.
EDWIN C. WALLACE.